(12) United States Patent
Roehm et al.

(10) Patent No.: US 10,074,994 B2
(45) Date of Patent: Sep. 11, 2018

(54) POWER TOOL SYSTEM

(71) Applicant: Robert Bosch GmbH, Stuttgart (DE)

(72) Inventors: Tobias Roehm, Wildberg-Sulz (DE); Michael Frank, Bretten (DE); Heiko Sgarz, Leonberg (DE); Reiner Krapf, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 14/791,545

(22) Filed: Jul. 6, 2015

(65) Prior Publication Data

US 2016/0372939 A1    Dec. 22, 2016

(30) Foreign Application Priority Data

Jun. 17, 2015  (DE) .................. 20 2015 004 274 U

(51) Int. Cl.
*H02J 7/00* (2006.01)
*B25F 5/00* (2006.01)

(52) U.S. Cl.
CPC .............. *H02J 7/0013* (2013.01); *B25F 5/00* (2013.01); *H02J 7/0042* (2013.01)

(58) Field of Classification Search
CPC ...... H02J 7/0013; H02J 7/0042; H01M 10/46; H01M 2/1055

USPC .......................................... 320/112–115, 137
See application file for complete search history.

(56) References Cited

U.S. PATENT DOCUMENTS

| 8,851,200 B2 | 10/2014 | Gray et al. | |
|---|---|---|---|
| 2003/0030415 A1* | 2/2003 | Tamai | H02J 7/0054 320/162 |
| 2011/0147031 A1* | 6/2011 | Matthias | B25F 5/02 173/217 |
| 2012/0318546 A1* | 12/2012 | Gray | H01M 2/1055 173/20 |

* cited by examiner

*Primary Examiner* — Drew A Dunn
*Assistant Examiner* — Zixuan Zhou
(74) *Attorney, Agent, or Firm* — Maginot, Moore & Beck LLP

(57) ABSTRACT

A power tool system includes at least one power tool, in particular at least one measuring tool, which has a holder for at least partial insertion of a rechargeable battery pack, and a rechargeable battery pack, in particular a rechargeable battery pack including lithium cell chemistry, for reversible insertion into the holder of the at least one power tool. The holder and the rechargeable battery pack have compatible mechanical and electrical interfaces for mechanical and electrical contact-connection of the power tool and the rechargeable battery pack.

17 Claims, 8 Drawing Sheets

POWER TOOL SYSTEM

This application claims priority under 35 U.S.C. § 119 to patent application no. DE 20 2015 004 274.0, filed on Jun. 17, 2015 in Germany, the disclosure of which is incorporated herein by reference in its entirety.

BACKGROUND

The disclosure relates to a power tool system having at least one power tool, in particular at least one measuring tool, and also having a rechargeable battery pack for reversible insertion into the holder of the at least one power tool. According to the disclosure, the power tool system has a battery adapter.

U.S. Pat. No. 8,851,200 comprises a rechargeable battery for use in a power tool and in a non-motorized measuring tool.

SUMMARY

The proposed power tool system proceeds from a power tool system having at least one power tool, in particular at least one measuring tool, which has a holder for at least partial insertion of a rechargeable battery pack, and also having a rechargeable battery pack, in particular a rechargeable battery pack which is based on a lithium cell chemistry, for reversible insertion into the holder of the at least one power tool, wherein the holder of the at least one power tool and the rechargeable battery pack have compatible mechanical and electrical interfaces for mechanical and electrical contact-connection of the power tool and the rechargeable battery pack.

According to the disclosure, the power tool system has a battery adapter which is intended to exchangably hold, in particular to fully enclose, at least one battery, and also has mechanical and electrical interfaces, which are compatible with the holder of the power tool, for reversible insertion into the holder of the at least one power tool and for mechanical and electrical contact-connection to the at least one power tool.

A power tool system according to the disclosure therefore comprises at least one power tool, in particular at least one measuring tool, a rechargeable battery pack and also a battery adapter which are intended to enable, in the combinations power tool and rechargeable battery pack or power tool and battery adapter, operation of the at least one power tool.

A power tool can be understood to mean various embodiments of a cable-free power tool, for example a screwdriver, an impact screwdriver, a drill, a hammer drill, a jigsaw, a saw, a grinder, an angle grinder, a circular saw, a planing machine, a pair of shears, a multifunctional tool or other embodiments of a power tool for tradespeople or DIYers which appear to be expedient to a person skilled in the art A measuring tool can preferably also constitute a power tool of the power tool system according to the disclosure. Measuring tools of different designs are known and can be realized, in particular, for example as a heat measuring device, thermal imaging camera, inspection camera, voltage measuring device, location device, distance measuring device, moisture measuring device, angle or level measuring tool or as another measuring tool which appears to be expedient to a person skilled in the art.

During operation of the power tool, the power tool, in particular the measuring tool, is supplied with energy by the energy supply apparatus in the form of a rechargeable battery pack or one or more batteries. Within the scope of this application, a battery pack is to be understood to mean a package of rechargeable batteries preferably comprising a plurality of electrochemical rechargeable battery cells, which package of rechargeable batteries provides electrical energy for operation of a power tool and is at least partially held in a holder of the power tool in an exchangeable manner. The rechargeable battery pack constitutes, in particular, a rechargeable secondary battery which can be recharged when connected to a charging station. Rechargeable batteries with a cell chemistry which provides a high power and/or energy density is preferably suitable for supplying energy to the power tool. Rechargeable batteries of this kind currently include, for example, rechargeable batteries with a lithium and lithium ion cell chemistry, in particular lithium iron phosphate, lithium manganese oxide, lithium nickel cobalt manganese oxide, overlithiated lithium nickel cobalt manganese oxide, lithium sulfur, lithium polymer and lithium oxygen rechargeable batteries. It is also feasible for this power supply apparatus which is independent of the mains supply system to also be realized as a fuel cell, capacitor or another kind of energy store which appears to be expedient to a person skilled in the art or as a combination/several of these.

The power tool, in particular the measuring tool, has a holder, in particular a holder in the housing of the power tool, into which holder the rechargeable battery pack is at least partially inserted, for holding the rechargeable battery pack. The rechargeable battery pack is arranged on the power tool by inserting, in particular plugging or pushing, the rechargeable battery pack into the holder of the power tool. The holder of the at least one power tool and the rechargeable battery pack have compatible mechanical and electrical interfaces for mechanical and electrical contact-connection of the power tool and the rechargeable battery, in order to mechanically lock and fasten the rechargeable battery pack in the holder of the power tool and also in order to electrically contact-connect the rechargeable battery pack to the power tool. The rechargeable battery pack can therefore be coupled to the device housing of the power tool in such a way that, when the rechargeable battery pack is at least partially inserted into the holder of the power tool, the rechargeable battery pack is electrically connected to the power tool. The holder of the power tool is likewise mechanically locked and the rechargeable battery pack is mechanically connected to the power tool, in particular to the holder of the power tool. The rechargeable battery pack can be inserted into the holder of the power tool in a reversible manner. The rechargeable battery pack can preferably be inserted into the power tool in a reversible manner by a user of the power tool system in a simple manner without using a tool, and therefore can be arranged on the power tool in order to supply energy to said power tool, and also can be removed from the power tool in a reversible manner.

According to the disclosure, the power tool system has a battery adapter which is intended to exchangably hold, in particular to fully enclose, at least one battery. 'To exchangably hold' is intended to be understood to mean, in particular, that the battery, for example when it is empty, can be removed from the battery adapter and preferably can be replaced by a new, full battery. This exchange of the at least one battery can particularly preferably be carried out directly by a user of the power tool system without the aid of tools.

The battery adapter serves to hold at least one battery, preferably a plurality of batteries. The batteries may be, in particular, primary batteries or secondary batteries. Commercially available batteries, in particular alkali manganese batteries, nickel metal hydride batteries, lithium ion batteries or else lithium ion rechargeable batteries, can preferably be used in conjunction with the battery adapter for supplying energy to the power tool. The battery adapter is preferably intended to hold batteries with different diameters and/or lengths, as a result of which various, in particular commercially available, batteries can be used in the battery adapter. The battery adapter is preferably intended to hold commercially available primary batteries in the form of AA, AAA and/or 9 volt block batteries.

The battery adapter preferably combines the at least one battery or the plurality of batteries in a battery adapter housing, wherein the battery or the batteries are particularly preferably fully enclosed by the housing of the battery adapter. The batteries in the battery adapter are preferably connected to one another by the electrical contacts in the interior of the battery adapter in a parallel or a series circuit. The electrical contacts are further routed out of the housing of the battery adapter or into at least one contact apparatus, and there form at least one electrical interface which comprises at least two electrical poles. The electrical interface of the battery adapter serves for electrical contact-connection and therefore for electrically connecting the battery adapter to the power tool. Therefore, within the scope of this application, a battery adapter is intended to be understood to be an adapter which provides energy for supplying energy to a power tool by means of at least one battery which is held in the battery adapter, and which can be inserted into the holder of the power tool in an exchangeable manner. The energy is output to the power tool in particular during operation of the power tool.

The battery adapter is intended to be reversibly inserted into the holder of the at least one power tool, in particular of the measuring tool. The battery adapter is arranged on the power tool by at least partial insertion, in particular plugging or pushing, of the battery adapter into the holder of the device housing of the power tool, which holder complements the battery adapter. In order to be reversibly inserted into the holder of the at least one power tool and in order to be mechanically and electrically contact-connected to the power tool, the battery adapter has mechanical and electrical interfaces which are compatible with, in particular complement, the holder of the power tool. The battery adapter can therefore be coupled to the device housing of the power tool in such a way that, when the battery adapter is inserted into the holder of the power tool, the power tool is electrically coupled to the battery adapter and further mechanically locked by the battery adapter.

The battery adapter and the rechargeable battery pack preferably have a substantially identical shape at least in parts. Both the rechargeable battery pack and the battery adapter are preferably intended to be at least partially inserted into the same holder of the at least one power tool. The rechargeable battery pack and the battery adapter therefore preferably have the same, in particular mechanical and electrical, interfaces at least in part. The rechargeable battery pack and the battery adapter have, in particular, a shape which is compatible with, in particular complements, the holder of the power tool.

The mechanical interface or the mechanical interfaces serves/serve to mechanically lock the battery adapter or the rechargeable battery pack to the power tool in the inserted state, that is to say in particular in the holder of the power tool. Furthermore, the mechanical interface or the mechanical interfaces serves/serve to ensure that the appropriate battery adapter or the appropriate rechargeable battery pack is associated with the power tool. The mechanical interface or the mechanical interfaces can be used, in particular, to allow insertion and electrical contact-connection of the rechargeable battery pack or the battery adapter only when the housing of the rechargeable battery pack or one of the battery adapters has a mechanical shape which corresponds to the holder of the power tool. Therefore, the design of the battery adapter or of the rechargeable battery pack which complements the holder of the power tool forms a kind of mechanical coding of the battery adapter or of the rechargeable battery pack.

The use of incompatible rechargeable battery packs and/or battery adapters in a power tool of the power tool system is advantageously precluded by a mechanical and/or electrical interface of the rechargeable battery pack or battery adapter which is incompatible with the holder of the power tool.

In an advantageous embodiment of the power tool system according to the disclosure, the at least one power tool, in particular a measuring tool, can be selectively operated by a rechargeable battery pack or a battery adapter.

A power tool, in particular a measuring tool, of a power tool system can advantageously be supplied with energy for operation of the power tool both by a rechargeable battery pack and by a battery adapter. It is therefore possible, according to the disclosure, for the power tool to be operated both by a battery adapter and by a rechargeable battery pack. Therefore, a user of the power tool can use both designs of an energy supply apparatus for operating the power tool.

It is advantageously possible to prevent an incorrect rechargeable battery pack or battery adapter from being associated with the power tool by virtue of a design of the mechanical and electrical interfaces of the battery adapter or of the rechargeable battery pack which is compatible with the holder of the power tool. Incorrect assignment of this kind could take place, in particular, if a plurality of different rechargeable battery packs and/or battery adapters for various electrical devices are available, and therefore a mix-up cannot be precluded.

A plurality of power tools of the power tool system can preferably be supplied with energy and therefore operated selectively by the rechargeable battery pack or by the battery adapter. In this way, a system of power tools and energy storage apparatuses, in particular a rechargeable battery pack and battery adapter, which are compatible with one another are available to the user of the power tool system. Freely selectable power tools can advantageously be operated in a freely selectable manner either by a battery adapter or by a rechargeable battery pack. It is therefore possible for the user of the power tool system to choose between different power tools and to carry a rechargeable battery pack and/or a battery adapter in order to operate said power tools. Therefore, the user of the power tool system ultimately has to carry only a rechargeable battery pack and/or a battery adapter, even if he wishes to use a plurality of power tools of a power tool system. Consequently, the user of the power tool system therefore has a high degree of flexibility when choosing his power tool and advantageously does not need to give any thought to how to supply energy to the selected power tool. It is no longer necessary to keep available a large number of rechargeable battery packs, which are each compatible with and intended for a single power tool, and the charging stations which are compatible with the rechargeable battery packs, this being laborious. If the rechargeable battery pack is intended to be emptied, the user of the power tool system can use commercially available batteries for supplying energy to the correspondingly selected power tool by means of the battery adapter for this purpose.

Furthermore, it is advantageously possible to remove a discharged rechargeable battery pack or a discharged battery adapter—to be more precise a battery adapter with a discharged battery contained therein—from the power tool at any time and to exchange it for a charged rechargeable battery pack or a charged battery adapter—to be more precise a battery adapter with a charged battery contained therein. It is therefore particularly preferably possible for a user of the power tool system to use a power tool particularly when a rechargeable battery pack is discharged and no charging device for charging the rechargeable battery pack and/or no further rechargeable battery pack are/is available. Instead of the required charging of the rechargeable battery pack, the user of the power tool can then insert the battery adapter, which is advantageously fitted with batteries, into the power tool and then start up the power tool.

A user of the power tool system is advantageously able to freely select how to supply energy to a power tool to be used. By using the rechargeable battery pack for supplying energy to the power tool, the user of the power tool has the option to recharge the rechargeable battery pack by means of a charging station after said battery pack is discharged. Therefore, particularly cost-effective and economically expedient use of the power tool is possible.

By using a battery adapter, which holds batteries, for supplying energy to the power tool, the user of the power tool is advantageously able to operate the power tool even when the rechargeable battery pack is discharged and no charging station for charging the rechargeable battery pack and/or no further rechargeable battery pack are/is available. By using the battery adapter, commercially available standard batteries, such as alkaline primary batteries in the form of AA or AAA or 9 V block batteries for example, can advantageously be used in the power tool in order to supply energy to the said power tool. Therefore, the power tool can also be used for a relatively long period of time in locations where a supply of energy for charging an emptied rechargeable battery pack is not ensured. Therefore, the power tool can be used in a particularly flexible manner and independently of the mains supply system.

In a preferred embodiment of the power tool system according to the disclosure, the battery adapter, when it is inserted, closes, in particular locks, the holder of the at least one power tool.

According to the disclosure, the power tool, in particular the holder of the power tool for holding the battery adapter, is closed, in particular locked, by the battery adapter when the said battery adapter is in its arranged state, in this embodiment. The interior of the housing of the power tool is therefore advantageously protected against damage and environmental influences, for example against the ingress of moisture and dust. Furthermore, a separate locking apparatus, in particular a cover or a locking cap for locking the holder of the power tool, is particularly advantageously not required. Therefore, it is advantageously possible to realize that no separate arrangements, such as locking caps, covers, flaps or the like, have to be kept ready in order to lock or close the holder of the power tool, it being possible for the said arrangements to be easily damaged or lost if handled incorrectly. It is therefore possible to close, in particular lock, the holder of the power tool by inserting the battery adapter (and in particular also the rechargeable battery pack). Therefore, a user of the power tool system only has to take care of two components—the battery adapter and the power tool.

In an advantageous embodiment of the power tool system, the battery adapter is of at least substantially two-part design.

The battery adapter can advantageously have a holder, which is provided in the interior of the housing of the battery adapter, for holding the at least one battery. When the battery adapter is of at least substantially two-part design, the said holder of the battery adapter can be configured to be easily accessible to a user. "At least substantially two-part design" means, in particular, that the battery adapter can be broken down into two important constituent parts, in particular can be broken down in a reversible manner and without destroying the battery adapter. Further, in particular, relatively small and/or removable or detachable constituent parts of the battery adapter can be provided in addition to the said two important constituent parts.

The two constituent parts of the battery adapter which is of at least substantially two-part design can be designed such that they can be plugged together or mechanically connected in some other way. In particular, the battery adapter can advantageously be intended to be broken down into its at least two constituent parts without using a tool. In this way, it is possible for a user of the power tool system to open the battery adapter in a particularly simple manner in order to insert batteries and to fit the said battery adapter.

In an advantageous embodiment of the power tool system according to the disclosure, the battery adapter comprises at least one holder part for holding the at least one battery in the battery adapter and comprises a locking part for locking the holder part of the battery adapter.

Therefore, insertion of the at least one battery into the battery adapter is possible in a particularly simple manner according to the disclosure by the battery being inserted, in particular plugged or placed, into the at least one holder part of the battery adapter, and the battery adapter then being locked by means of the locking part for locking the holder part of the battery adapter. Locking of the holder part of the battery adapter by means of the locking part does not necessarily have to be understood to mean mechanical locking. In particular, the locking part for locking the holder part can serve to lock the holder part even without mechanical locking, in particular without mechanical interlocking, latching or the like. It should further be noted that the locking part for locking the holder part of the battery adapter does not necessarily have to serve to tightly lock the holder part of the battery adapter. Both the locking part and the holder part can have openings and/or cutouts. Therefore, the locking part preferably serves only to lock and fix the at least one battery in the holder part of the battery adapter.

Both the holder part and the locking part of the battery adapter preferably have electrical contacts by means of which contact can be made with the poles of the at least one battery which is held in the battery adapter and therefore the voltage which is applied to the poles is tapped off and passed on. In a preferred embodiment of the battery adapter, the holder part is intended to hold a plurality of batteries, for example two, three or four batteries, in the battery adapter.

The holder part of the battery adapter has a shape which complements the shape of the battery which is to be inserted or held (also called: battery holder in the text which follows). In one embodiment of the battery adapter, the holder part is preferably intended to hold batteries of different diameters and/or different lengths. Therefore, insertion of different, in particular commercially available, batteries into the battery adapter is advantageously possible. The holder part of the battery adapter is preferably intended to hold commercially available batteries in the form of AA, AAA or 9 V block batteries. The shaped battery holder of the holder part which complements the shape of the battery which is to be held advantageously permits an inserted battery to be held and/or to be fixed in a stable manner in an arranged position. Consequently, a movement of the battery, in particular in association with a loss of electrical contact, as can occur, for example, as a result of vibrations or shocks to the battery adapter, can be avoided.

In an advantageous embodiment of the power tool system according to the disclosure, the battery adapter comprises at least one insert part for at least partial insertion into the holder of the at least one power tool and comprises a closure part.

In particular, the insert part of the battery adapter defines that part of the battery adapter which disappears into the power tool in the inserted, that is to say arranged, state of the battery adapter. In contrast, the closure part of the battery adapter projects out of the power tool in the inserted, that is to say arranged, state of the battery adapter. It should be noted that both the insert part and the closure part do not necessarily have to be considered to be individual components, but rather define only the function of the correspondingly identified part of the battery adapter.

In an advantageous embodiment, the division of the battery adapter into an insert part and a closure part corresponds to the at least substantially two-part breakdown of the battery adapter into a holder part for holding the at least one battery and into a closure part for closing the holder part of the battery adapter.

The insert part of the battery adapter preferably has a shape which is compatible with, in particular complements, the holder of the power tool.

The insert part of the battery adapter preferably serves to hold or arrange the electrical and/or mechanical interfaces for contact-connecting the battery adapter to the power tool. In contrast, the closure part of the battery adapter preferably serves as a grip or grip element by way of which a user of the power tool system can hold and move the battery adapter, in particular can also withdraw the said battery adapter from the holder of the power tool.

Owing to the design according to the disclosure of the battery adapter with an insert part and a closure part, it is possible for a user of the power tool system to use the battery adapter in a particularly simple, intuitive and practical manner. In particular, it is not possible for a user of the power tool to arrange the battery adapter on the power tool device in an impermissible manner, that is to say in particular to insert the battery adapter into the holder of the power tool in an impermissible manner.

In an advantageous embodiment of the power tool system according to the disclosure, the insert part of the battery adapter is designed such that it can be fixedly integrated with the holder of the at least one power tool.

In this embodiment of the battery adapter, the insert part of the battery adapter can be fixedly integrated into the holder of a power tool, so that the insert part is connected to the corresponding power tool in a force-fitting and/or interlocking manner in an arranged, that is to say integrated, state. In order to fixedly integrate the insert part with the holder of the at least one power tool, mechanical interfaces which have, for example, locking means such as retaining, hook, latching, clamping and/or clip connections, can be provided in particular.

In this embodiment of the battery adapter, the insert part can advantageously be fixedly connected to the holder of the power tool by the insert part being integrated into the holder by means of the mechanical interfaces. It is therefore difficult or no longer possible for the insert part of the battery adapter to fall out and/or become lost in this integrated arrangement.

In one embodiment of the battery adapter, it is further feasible for the insert part to not be removed or for it to be possible for the said insert part to be removed only using a tool.

In an advantageous embodiment of the power tool system according to the disclosure, at least the closure part of the battery adapter serves to lock the holder of the at least one power tool.

The closure part of the battery adapter preferably closes the holder of the power tool in the inserted state of the battery adapter in such a way that the interior of the housing of the power tool, in particular the holder, is protected against damage and environmental influences, in particular against the ingress of moisture and dust. In this case, the closure part of the battery adapter particularly preferably projects out of the power tool in the state in which the battery adapter is inserted in the holder of the power tool. In this way, the closure part of the battery adapter serves as a grip or grip region which can be used to easily remove the battery adapter from the holder of the power tool.

In an advantageous embodiment of the power tool system according to the disclosure, the closure part of the battery adapter can be mechanically fastened, in particular can be reversibly mechanically fastened, to the insert part of the battery adapter and/or to a housing of the power tool.

In one embodiment of the power tool system, the insert part and the closure part of the battery adapter can be considered to be individual components, wherein the two parts preferably form the holder part and the locking part of the battery adapter. In one embodiment of the battery adapter, the insert part of the battery adapter can be realized as a holder part for holding the at least one battery in the battery adapter, and the closure part of the battery adapter can be realized as a locking part for locking the holder part of the battery adapter. In an alternative embodiment, the closure part of the battery adapter can be realized as a holder part for holding the at least one battery in the battery adapter, and the insert part can be realized as a locking part for locking the holder part of the battery adapter.

If, in this embodiment, the closure part of the battery adapter can be mechanically fastened, in particular reversibly mechanically fastened, to the insert part of the battery adapter, the insert part and the closure part of the battery adapter, that is to say in particular the holder part and the locking part of the battery adapter, can be connected in a force-fitting and/or interlocking manner. The battery adapter which is substantially formed as an assembly therefore comprises the insert part and the closure part of the battery adapter. "Substantially formed as an assembly" means that further constituent parts, in particular relatively small constituent parts, of the battery adapter which do not necessarily have to be designed in the assembly of the battery adapter, can also be provided in addition to the closure part and the insert part.

In this embodiment, the at least one battery can advantageously be inserted into a lockable battery adapter, so that the battery adapter, in the locked state, can be considered to be a battery adapter assembly which is easy to handle.

In a preferred embodiment of the power tool system, the closure part of the battery adapter can be mechanically fastened, in particular can be reversibly mechanically fastened, both to the insert part of the battery adapter and to a housing of the power tool.

In this particularly preferred embodiment, the battery adapter which is assembled to form an assembly in its closed state can be inserted into the holder of the power tool, wherein the closure part of the battery adapter is mechanically fastened to a housing of the power tool, in particular to means for mechanical locking which are connected to the holder and/or to the housing of the power tool. As a result of the mechanical locking to the housing of the power tool, it is difficult or no longer possible for the battery adapter to accidentally fall or slip out.

It should be noted that, in one embodiment of the power tool system, provision is made for the insert part to be mechanically fastened, in particular reversibly mechanically fastened, to a housing of the power tool on its own or in combination with the closure part.

In an alternative embodiment of the power tool system, the insert part of the battery adapter is designed such that it can be fixedly integrated with the holder of the power tool, wherein the closure part of the battery adapter can be mechanically fastened to a housing of the power tool. In particular, no mechanical means which connect the insert part and the closure part of the battery adapter are required.

All of the embodiments of the battery adapter according to the disclosure mentioned here permit intuitive and simple handling of the battery adapter by a user of the power tool system.

In an advantageous embodiment of the power tool system according to the disclosure, at least the insert part of the battery adapter has an electrical interface for electrical contact-connection to the at least one power tool.

The electrical interface for electrical contact connection comprises at least electrical contact elements in order to establish an electrical connection between the battery adapter and the power tool by inserting the battery adapter into the power tool.

In a preferred embodiment, the electrical interface is accommodated in a contact dome which is provided in the insertion direction of the battery adapter. The contact dome, owing to a special shape and/or a special eccentric arrangement, preferably serves to prevent improper contact-connection of the electrical interface, in particular of the contact elements, of the battery adapter and the power tool. In particular, rotated positions of the battery adapter in relation to the contacts of the power tool can be precluded in this way. The battery adapter can advantageously be inserted into the power tool only in one single position or orientation. The electrical interface of the battery adapter is advantageously located in a region of the insert part which is protected against accidental access by the user, for example in a recess in the contact dome.

A particularly reliable electrical interface of the battery adapter can be realized in this way. Incorrect or improper handling, in particular improper insertion into the holder of the power tool, can be avoided in this way.

Furthermore, soiling of the contacts can be avoided by using contact elements which are arranged in a recessed manner in a contact dome.

In an advantageous embodiment of the power tool system according to the disclosure, the battery adapter has an axial length which is greater than a diameter of the insert part, and in particular is greater than a diameter of the battery adapter.

The battery adapter preferably has a substantially cylindrical shape which defines an axial length of an axis which characterizes the substantially cylindrical shape. In this case, the axial length denotes, in particular, a length which is measured in the insertion direction of the battery adapter. By selecting the axial length to be greater than a diameter of the insert part, it is advantageously possible that insertion of the battery adapter into the holder of the power tool necessarily has to be carried out in the direction of the orientation of the battery adapter in relation to the holder of the power tool. Incorrect or accidental insertion of the battery adapter in an unintended manner, for example in a rotated state or the like, is therefore not possible. A user of the power tool system is therefore able to use the battery adapter in a simple, intuitive and, in particular, also reliable manner.

By selecting the axial length to be greater than a diameter of the battery adapter, it is advantageously possible to realize expedient proportions of the battery adapter which aid simple and intuitive use of the battery adapter.

In an advantageous embodiment of the power tool system according to the disclosure, the battery adapter has a mechanical and/or electrical identifier by means of which a power tool of the power tool system identifies whether the battery adapter is inserted into the holder of the power tool.

Therefore, it is advantageously possible to realize that the power tool of the power tool system executes a function and/or changes or assumes an operating state as a result of identifying that a battery adapter is inserted into the holder of the power tool.

An 'operating state of the power tool' is intended to denote, in particular, an information processing operation, an information output operation and/or an information input operation and/or an information entry operation in the context of which the power tool uses an operating program and/or a regulation routine and/or a control routine and/or an evaluation routine and/or a calculation routine and/or a display routine or the like. In particular, the application of an operating state has an effect on the function of the power tool.

A mechanical identifier can be realized, for example, by means of a switch or button which is operated when a battery adapter—but not a rechargeable battery pack—is inserted into the holder of the power tool.

In addition or as an alternative, the insertion of a battery adapter into a power tool of the power tool system can be identified in a particularly reliable manner using an electrical identifier which is not identical to the output voltage of the battery adapter. For example, an electrical identifier can be realized in a simple manner by means of the integration of a coding resistor into the battery adapter. Owing to the use of an identification or read-out circuit in the power tool, the resistance value of the coding resistor can be read out, it being possible for the said resistance value to be interpreted as an indicator for a battery adapter, depending on the obtained value. In this way, insertion of a battery adapter into the holder of the power tool can be identified depending on the ascertained resistance value. Insertion of a battery adapter into the holder of the power tool can preferably be distinguished from insertion of a rechargeable battery pack into the holder of the power tool depending on the ascertained resistance value.

A large number of functions can particularly advantageously be controlled as a result of identifying that a battery adapter is inserted into the holder of the power tool. Furthermore, provision can be made for identification of an inserted battery adapter to be carried out in the switched-off state of the power tool too.

In an alternative or additional embodiment of the power tool system, provision can also be made for identifying that a battery pack is inserted into the holder of the power tool using a mechanical and/or electrical identifier.

In an advantageous embodiment of the power tool system according to the disclosure, the at least one power tool has means which, as a result of it being identified that a battery adapter is inserted into the holder of the power tool, allow a deep-discharge protection apparatus of the power tool to be deactivated and/or a charging protection apparatus of the power tool to be activated.

According to the disclosure, use can comprise, in particular, electrical circuits, circuitry, electrical switches and/or mechanical switches. The means of the power tool preferably allow identification of the insertion of a battery adapter into the holder of the power tool even in a switched-off state of the power tool.

A deep-discharge protection apparatus which, when rechargeable battery packs are used, serves to prevent deep-discharging of the rechargeable battery, for safety reasons amongst other things, can advantageously be deactivated. As an alternative or in addition, a charging protection apparatus of the power tool can be activated in order to prevent recharging of the at least one battery which is inserted into the battery adapter. Both embodiments, on their own or in combination, serve to increase the safety and the operator control convenience for a user when using the power tool in conjunction with the battery adapter.

In an alternative or additional embodiment of the power tool system according to the disclosure, provision can also be made for a deep-discharge protection apparatus of the power tool to be activated and/or for a charging protection apparatus of the power tool to be deactivated as a result of it being identified that a rechargeable battery pack is inserted into the holder of the power tool.

In an advantageous embodiment of the power tool system according to the disclosure, the battery adapter and/or the at least one power tool have/has a voltage converter apparatus for adjusting an output voltage of the at least one battery.

In this connection, a voltage converter apparatus is understood to mean, in particular, a DC voltage converter which has an electrical circuit which converts a DC voltage which is supplied to the input of the apparatus into a DC voltage with a higher, lower or inverted voltage level. In particular, the voltage converter apparatus can have a DC voltage converter which is based on inductive or capacitive effects.

The voltage converter apparatus preferably serves to transform the output voltage or rated voltage of the at least one battery into an increased or reduced working voltage of the power tool. In particular, this does not mean that the rated voltage of the at least one battery is changed per se. The voltage conversion, in particular the transformation of the voltage, is preferably used in such a way that the output voltage which is output by the at least one battery which is inserted in the battery adapter is matched to an output voltage which is output by a rechargeable battery pack.

Furthermore, provision can also be made for the battery adapter and/or the at least one power tool to have a voltage converter apparatus for matching an output voltage or rated voltage of the at least one battery which, depending on a output voltage or rated voltage which is output by the at least one battery, provides different, in particular discrete, voltage converter stages. Typical output voltages of commercially available batteries of different forms, types or different cell chemistry can advantageously be transformed in this way. In this way, the voltage converter apparatus can make provision for, for example, an output voltage or rated voltage of 1.5 V of AA or AAA-type batteries, an output voltage or rated voltage of 4.5 V of a flat battery, an output voltage or rated voltage of 9.0 V of a 9 V block battery or the like, to be transformed to another, in particular higher, voltage.

The output voltage of the at least one battery is advantageously transformed to an output voltage which is typical of rechargeable battery packs, that is to say 3.6 V, 7.2 V, 10.8 V or 18 V for example.

In this way, it is particularly advantageously possible for a power tool of a power tool system to hold a voltage which is necessary for its operation irrespective of whether a rechargeable battery pack or a battery adapter is inserted into the holder of the power tool.

In an alternative embodiment of the power tool system according to the disclosure, in which the power tool has a voltage converter apparatus, it is analogously possible to also adjust an output voltage of the rechargeable battery pack, in particular to reduce the output voltage of the rechargeable battery pack to a level of an output voltage of a battery adapter.

In one advantageous embodiment of the power tool system according to the disclosure, the at least one power tool has means which, at least during operation as a result of it being identified that a battery adapter is inserted into the holder of the power tool, allows a voltage converter apparatus of the power tool to be activated or to be deactivated.

The means of the power tool for activating or deactivating a voltage converter apparatus comprise, in particular, an electrical circuit which is intended to activate or to deactivate the voltage converter apparatus. The circuit may also be, in particular, a simple electrical switch.

In this way, a voltage converter apparatus of the power tool can advantageously be activated or deactivated depending on an inserted battery adapter being identified. According to the disclosure, this lends the power tool of the power tool system a functionality which allows battery adapters, in particular battery adapters with different output voltages, to be used in the power tool in order to supply energy to the said power tool, by the output voltage of the battery adapter being matched to an input voltage of the power tool by transformation.

The power tool advantageously identifies the insertion of the battery adapter automatically and does not require any intervention or any action by a user.

In an advantageous embodiment of the power tool system according to the disclosure, the battery adapter has a temperature sensor for determining an ambient temperature of the at least one battery.

In the case of a battery adapter, it may prove disadvantageous that heat is lost in batteries when power is output, in particular when power is consumed in the case of the use of rechargeable batteries, this loss of heat possibly leading to an increase in the temperature of the battery adapter. Furthermore, during operation of the at least one battery which is inserted into the battery adapter, power losses may occur given a low ambient temperature. In order to prevent damage to the battery adapter and/or to the power tool and also to achieve a high degree of operating efficiency using a battery adapter, the power tool, in conjunction with a temperature sensor of the battery adapter, can advantageously monitor a temperature of the battery adapter, in particular of the at least one battery which is inserted into the battery adapter.

In particular, provision can be made for a function of the power tool or an operating mode of the power tool to be activated or to be deactivated when a maximum permissible operating temperature of the battery adapter, in particular of the at least one battery which is inserted into the battery adapter, is exceeded. For example, it is possible to switch off the power tool as a result of an excessively high operating temperature of the battery adapter.

As an alternative or in addition, provision can be made to activate or to deactivate an, in particular alternative, function of the power tool or an, in particular alternative, operating mode of the power tool when the minimum permissible operating temperature of the battery adapter, in particular of the at least one battery which is inserted into the battery adapter, is undershot. For example, it is possible to switch the power tool to an operating mode in which the power consumption by the power tool is reduced in a manner matched to an excessively low operating temperature of the battery adapter.

The integration of a temperature sensor in the battery adapter can therefore advantageously be used to increase the reliability and the efficiency when the battery adapter is used in a power tool system according to the disclosure.

In an advantageous embodiment of the power tool system according to the disclosure, the at least one mechanical interface of the battery adapter and/or of the power tool, which mechanical interface is compatible with the holder of the power tool for reversible insertion into the holder of the at least one power tool and/or for mechanical contact-connection to the at least one power tool, at least has fastening means, in particular retaining and/or latching and/or hook connections.

The fastening means serve to arrange and fasten the battery adapter in a stable and reversible manner after the said battery adapter is inserted into the holder of the power tool. The fastening means are advantageously designed in such a way that accidental decoupling is not possible and therefore it is not possible, in particular, for the battery adapter to fall out of the holder of the power tool. The fastening means are preferably designed in such a way that reversible removal of the battery adapter from the holder of the power tool directly by a user of the power tool system is not possible without the aid of tools.

The fastening means of the battery adapter are preferably of identical design to the fastening means of a rechargeable battery pack.

BRIEF DESCRIPTION OF THE DRAWINGS

The disclosure is explained in greater detail in the following description with reference to exemplary embodiments which are illustrated in the drawings. The drawings, the description and the claims contain numerous features in combination. A person skilled in the art will expediently also consider the features on their own and combine them to form expedient further combinations. Identical reference symbols in the figures denote the same elements.

In the drawings.

DETAILED DESCRIPTION

Figure 1A:
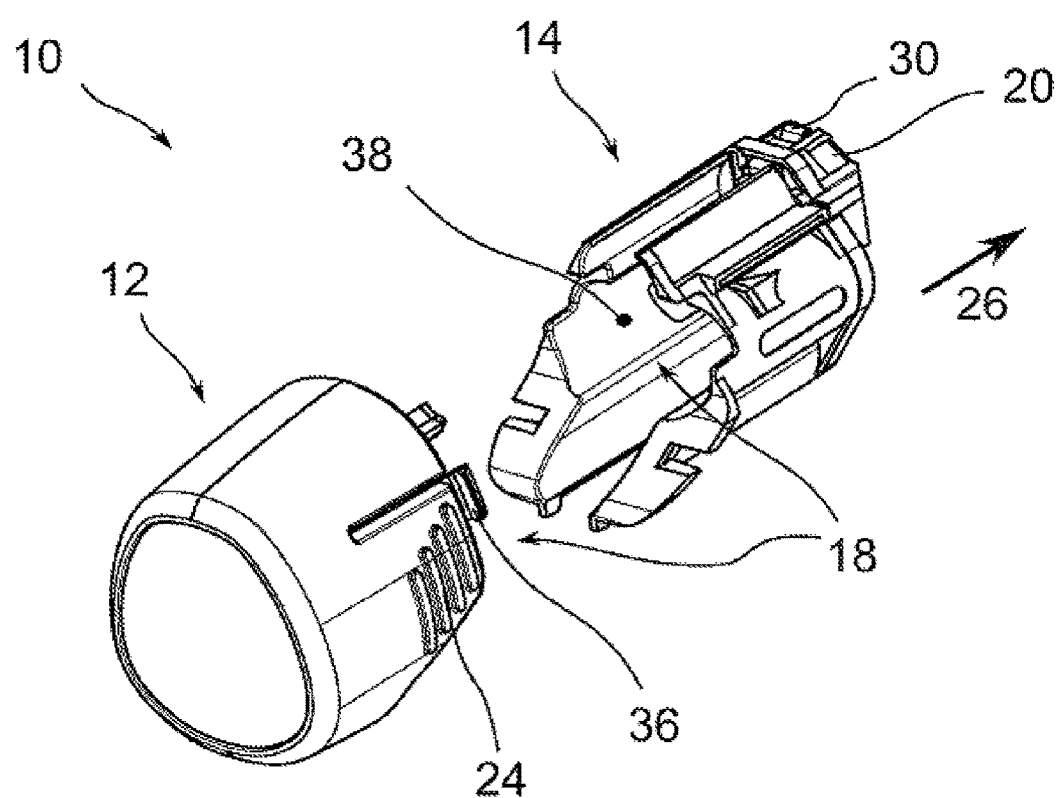
FIG. 1A shows a perspective view of an embodiment of a battery adapter which is divided into two, the batter adapter is shown in the open state.
Figure 1B:
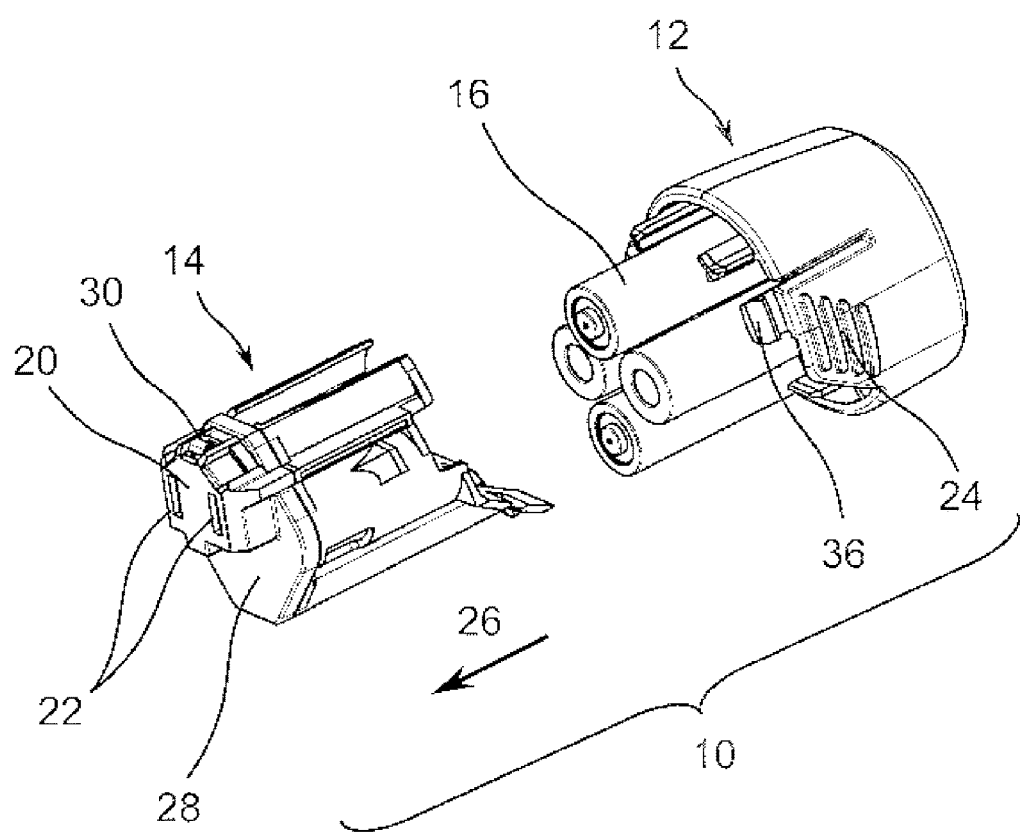
FIG. 1B shows a perspective view of an embodiment of a battery adapter which is divided into two and is fitted with 4 batteries.
Figure 1C:
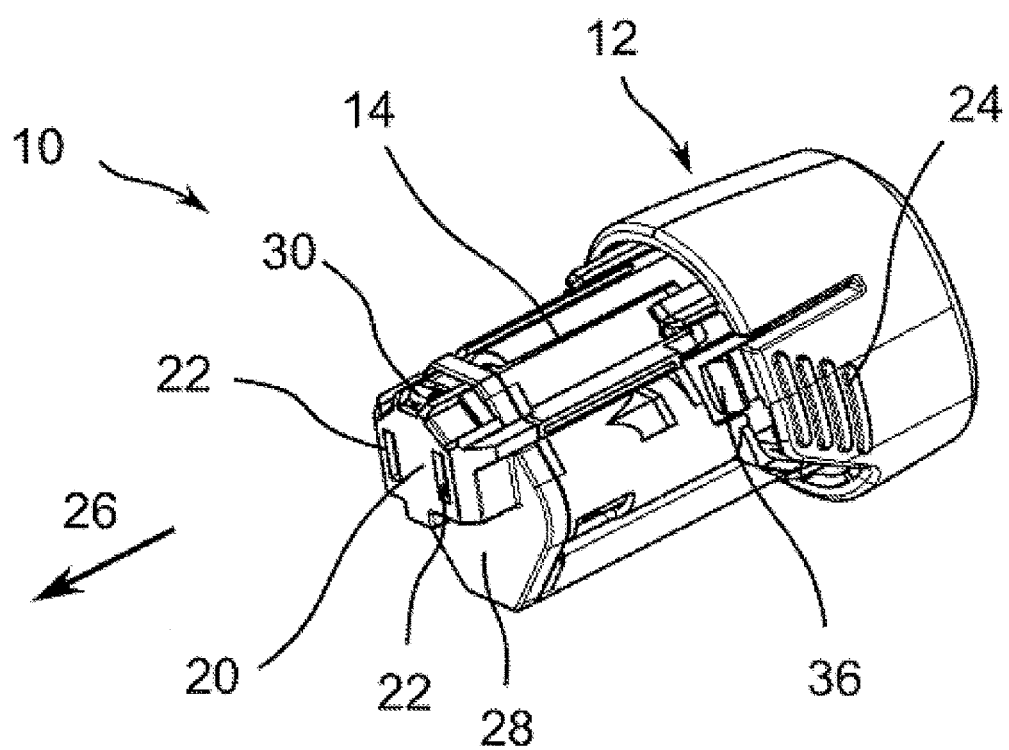
FIG. 1C shows a perspective view of an embodiment of a battery adapter which is divided into two and is shown in a closed state.

FIGS. 1A, 1B, and 1C show a battery adapter 10 of a power system 100 (cf. in particular FIGS. 4A, 4B, 5A, 5B, 6A, and 6B) for use in at least one power tool 50 (cf. in particular FIGS. 2A, 2B, 3, 4A, 4B, 5A, 5B, 6A, 6B) of the power tool system 100. The battery adapter 10 can advantageously be used both in traditional power tools 50, such as a screwdriver 50''' (cf. FIGS. 6A and 6B), a drill, an angle grinder for example, and also in measuring tools, such as a thermal imaging camera 50'' (cf. FIGS. 5A and 5B), an inspection camera, a locating device 50' (cf. FIGS. 4A and 4B), a distance measuring device or the like for example, for supplying energy to the power tool 50. Furthermore, the battery adapter 10 can, in principle, also be used in any other embodiment of a power tool 50 for use by a tradesperson or DIYer for supplying energy which appears to be expedient to a person skilled in the art.

In the illustrated embodiment, the battery adapter 10 is of two-part design and comprises a holder part 12 and a locking part 14. The holder part 12 serves to reversibly, in particular exchangably, hold four AA batteries 16 in the battery adapter 10. As is illustrated in FIG. 1A, the battery adapter 10 has, for this purpose, a battery holder 18 into which the four batteries 60 are inserted, as illustrated in FIG. 1B. The batteries 16 are connected to one another by electrical contacts, not illustrated in any detail here, in a series circuit in the interior of the battery adapter 10, wherein the electrical contacts are routed out of the housing of the battery adapter 10 and into at least one contact apparatus which is formed as contact dome 20. There, they form an electrical interface 22 which comprises at least two electrical poles. The locking part 14 is intended to lock the holder part 12 of the battery adapter 10 and therefore to lock the batteries 16 which are held in the battery adapter 10 and are then fully enclosed, in particular by the battery adapter 10 (cf. in particular FIG. 1C).

The holder part 12 of the battery adapter 10 has a grip region 24 by way of which a user of the power tool system 100 can hold and move the battery adapter 10, in particular can also insert the said battery adapter into the power tool 50 and/or remove the said battery adapter from the power tool 50.

Furthermore, the battery adapter 10, in particular the holder part 12 and the locking part 14, has means, not illustrated in any detail here, for connecting the holder part 12 to the locking part 14. These means are designed as hook, clamping, latching or clip connections and serve to mechanically connect and lock the holder part 12 and the locking part 14 and therefore to lock the battery adapter 10. The means permit a user of the power tool system 100 to reversibly close the battery adapter and also to open the battery adapter again in a simple manner without using a tool.

The battery adapter 10, in particular the housing of the said battery adapter, comprises the holder part 12 and the locking part 14, has a substantially cylindrical shape, having an axis which runs in the insertion direction 26 and substantially defines the cylindrical shape. The axial length of the battery adapter 10 is selected to be greater than the diameter both of the holder part 12 and of the locking part 14 in this case.

The housing of the battery adapter 10 is produced substantially from plastic material. The plastic material of the housing of the battery adapter 10 preferably comprises acrylonitrile butadiene styrene (copolymer) (ABS), polycarbonate (PC) or polyamide (PA). These plastic materials have good mechanical properties and a sufficient degree of thermal conductivity which makes them suitable for use as a material for the housing of the battery adapter 10. The plastic material is advantageously so stable that it remains undamaged under mechanical action, in particular in the event of shocks as a result of the battery adapter 10 falling for example.

The battery adapter 10 has, in the insertion direction 26, at its front end, in particular starting from a front end surface 28 of the battery adapter 10, a contact dome 20 which serves, in particular, to electrically contact-connect the battery adapter 10 and the power tool 50. The contact dome 20 is arranged eccentrically in relation to the center of the end surface 28 of the battery adapter 10 and extends substantially in the direction of the insertion direction 26. Two contact openings are formed in the end surface of the contact dome 20, in each case one electrical interface 22 of the battery adapter 10 being arranged in the said contact openings in the form of clamping contacts. The clamping contacts serve, in particular, to electrically contact-connect the battery adapter 10, in particular the four batteries 16 of the battery adapter 10, to the power tool 50 and are compatible with an electrical interface 22' (not illustrated in any detail here) of the holder 54 of the power tool 50. Owing to a preferably recessed arrangement of the clamping contacts in the contact openings in the contact dome 20, the clamping contacts can be protected against accidental access by a user and also against the ingress of dirt or the like. Furthermore, the contact dome 20 has further electrical interfaces 30 in the form of spring contacts on at least one of its outer faces. These spring contacts serve, in particular, to connect and/or link further functional elements to the power tool 50. One of the spring contacts is used, for example, to connect a temperature sensor 38 (cf. FIG. 1A) of the battery adapter 10 which serves to determine an ambient temperature of the four batteries 16 which are held in the battery adapter 10. A further contact is used for connecting an electrical identifier, in particular a coding resistor (not illustrated any detail here) of the battery adapter 10, to the power tool 50.

The special shapes of the contact dome 20 and of the battery adapter 10 form an embodiment of a mechanical interface, in particular a mechanical coding, which together with a holder 54 of a power tool 50, in particular the shape of said holder as a mechanical interface, form a coding system. In this way, the battery adapter 10 can be exclusively inserted, without being destroyed, into power tools 50 of a defined power tool system 100, which power tools are intended for the insertion of the battery adapter 10. Therefore, the contact dome 20 serves, on account of its special shape and/or of its special, in particular eccentric, arrangement, to prevent improper contact-connection of the electrical interfaces 22, 30 of the battery adapter 10 and of the power tool 50. In particular, rotated positions of the battery adapter 10 in relation to the electrical interfaces 22' of the power tool 50 can further be precluded in this way since the battery adapter 10 can advantageously be inserted into a power tool 50 of the power tool system 100 only in one single position and orientation.

The battery adapter 10 serves for reversibly and in particular exchangably holding batteries 16, so that emptied batteries 16 can be removed from the battery adapter 10 and can be replaced by new, full batteries 16, preferably primary batteries. Therefore, commercially available batteries 16, in particular alkali manganese batteries or nickel metal hydride batteries, but also rechargeable batteries such as lithium ion rechargeable batteries, for example, can advantageously be used in conjunction with the battery adapter 10 for supplying energy to the power tool 50 of the power tool system 100.

Figure 2A:
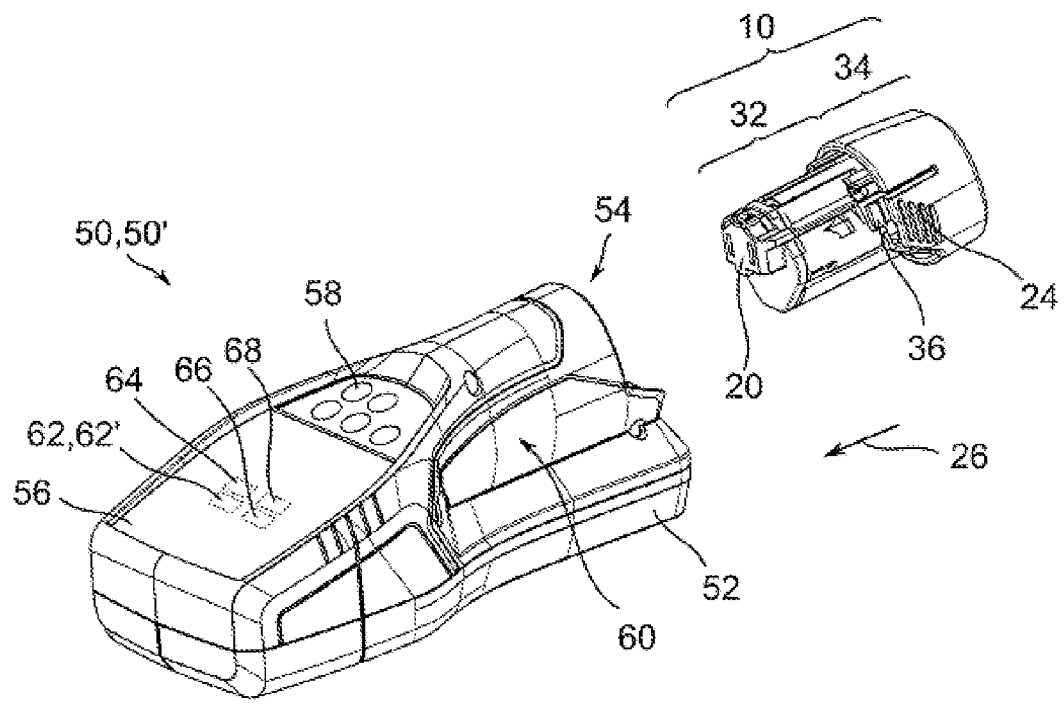
FIG. 2A shows a perspective view of an embodiment of a power tool of a power tool system with a battery adapter not inserted.
Figure 2B:
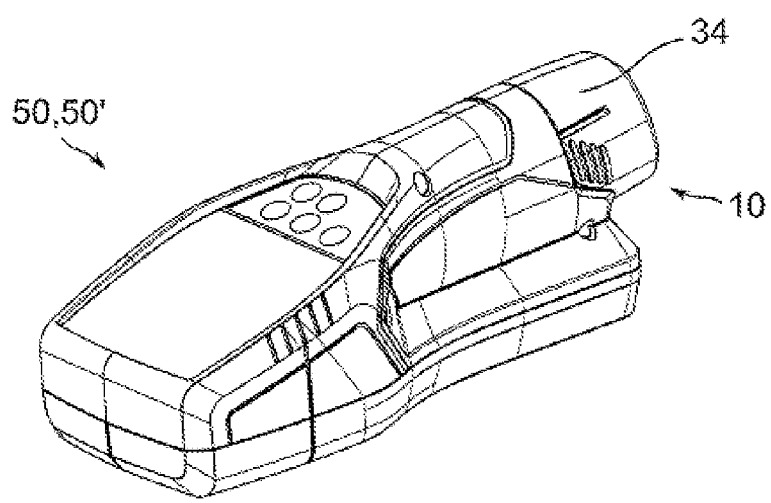
FIG. 2B shows a perspective view of an embodiment of a power tool of a power tool system with a battery adapter inserted.
Figure 3:
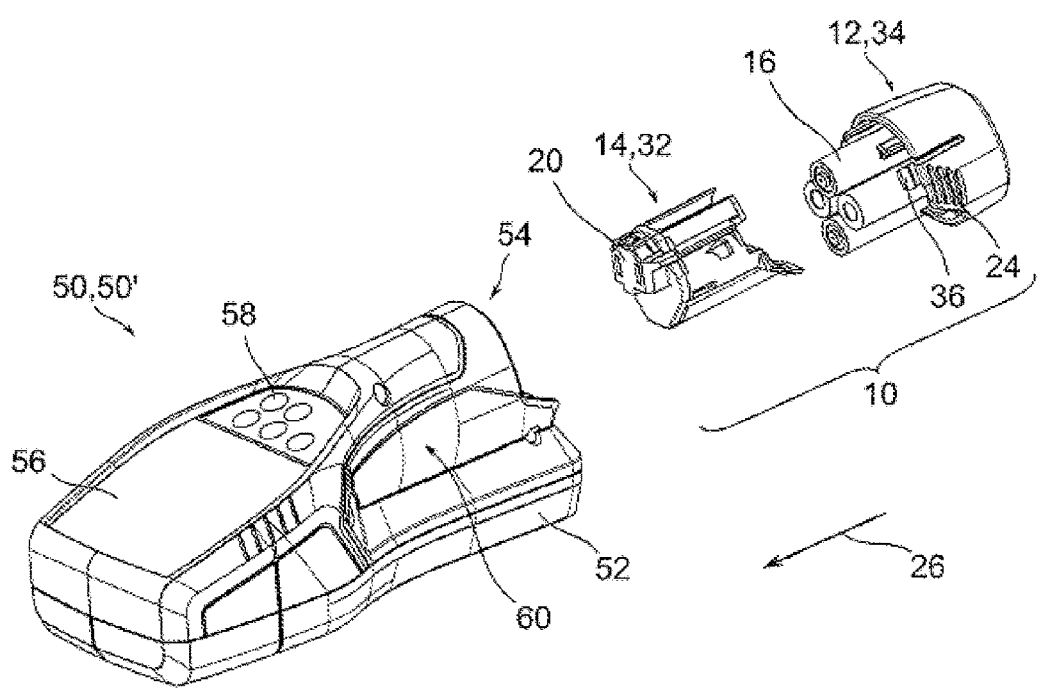
FIG. 3 shows a perspective view of an embodiment of a power tool of a power tool system with an at least two-part battery adapter not inserted.

As illustrated in FIGS. 2A, 2B, and 3, the battery adapter 10 is intended to be reversibly inserted into a holder 54 of a power tool 50, in particular of a measuring tool. By way of example, the measuring tool is designed as a locating device 50'. The locating device 50' serves to detect locatable objects which are hidden in a workpiece which is to be examined and has a housing 52, a display 56, operator control elements 58 and also a grip or grip region 60 which can be used by a user to control the locating device 50'. The locating device 50' further has a holder 54 which is integral with the grip or the grip region 60 of the locating device 50' and into which the battery adapter 10 can be inserted.

FIGS. 2A and 2B show a battery adapter 10 of the same embodiment as in FIGS. 1A, 1B, and 1C. The battery adapter 10 can be held by a user by way of its grip region 24 and can be at least partially inserted into a holder 54 of the power tool 50 in the insertion direction 26 by way of an insert part 32, and therefore can be arranged on the power tool 50 (FIGS. 2A, 2B). As illustrated in FIG. 2A, the battery adapter 10 has, in particular, at least one insert part 32 for at least partial insertion into the holder 54 of the power tool 50. That part of the battery adapter 10 which projects out of the holder 54 forms the closure part 34 which, in the shown embodiment, is substantially identical to the holder part 12 of the battery adapter 10. Therefore, the division of the battery adapter 10 into an insert part 32 and a closure part 34 corresponds substantially to the two-part breakdown of the battery adapter 10 into a holder part 12 for holding the four batteries 16 and into a locking part 14 for locking the holder part 12 of the battery adapter 10. The closure part 34 of the battery adapter 10 further serves to close and lock the holder 54 of the power tool 50. In this way, the holder 54 and the battery adapter 10—and in particular the electrical interfaces 22, 30 and mechanical interfaces thereof—are protected against damage and environmental influences such as the ingress of moisture and dust in the inserted state of the battery adapter 10.

For reversible insertion into the holder 54 and for mechanical and electrical contact-connection to the power tool 50, the battery adapter 10 and the holder 54 of the power tool 50 have compatible, in particular complementary, mechanical interfaces and electrical interfaces 22, 30, 22'. The holder 54 and an electrical interface 22' which is accommodated in the holder 54 (contact plate, not illustrated in any detail) form a mating coding of the holder 54 or of the electrical interface 22, 30 thereof which is shaped in a complementary manner to the mechanical coding of the battery adapter 10 and the contact dome 20 thereof. When the battery adapter 10 is inserted, the mating coding of the holder 54 interacts with the coding of the said battery adapter in such a way that insertion of the battery adapter 10 is possible only when the coding and the mating coding coincide. The electrical interface 22', in particular the contact point, of the holder 54 has two contact tongues and also further spring contacts (not illustrated in any detail) which, in the inserted state of the battery adapter 10, interact with the electrical interfaces 22, 30 of the contact dome 20. The electrical energy of the battery adapter 10 is supplied to the power tool 50 in particular by the two contact tongues in connection with the two clamping contacts of the electrical interface 22.

Furthermore, both the battery adapter 10 and the holder 54 of the power tool 50 have compatible mechanical interfaces in the form of hook connections 36 which serve to mechanically lock the battery adapter 10 to the power tool 50 in the inserted state, that is to say in particular in the holder 54 of the power tool 50. Therefore, the battery adapter 10 can be coupled to the housing 52 of the power tool 50, in particular to the holder 54 of the power tool 50, in such a way that, when the battery adapter 10 is inserted into the holder 54 of the power tool 50, the power tool 50 is electrically coupled to the battery adapter 10 and is furthermore mechanically locked. In the inserted state of the battery adapter 10 (cf. in particular FIG. 2B), the battery adapter 10 is held in a stable and secure manner in the holder 54 of the power tool 50 using the hook connection 36.

Whereas the holder part 12 and the locking part 14 of the battery adapter 10 are mechanically connected to form an, in particular unipartite, assembly of the battery adapter 10 using means for connecting the holder part 12 to the blocking part 14 in the embodiment of the battery adapter 10 shown in FIGS. 2A, 2B, and 3 constitutes an exemplary embodiment of a battery adapter 10 which is intended to be used in two parts. In this case, the division of the battery adapter 10 into an insert part 32 and a closure part 34 corresponds to the two-part breakdown of the battery adapter 10 into the holder part 12 and the locking part 14. In order to insert the battery adapter 10 into the holder 54 of the power tool 50, the insert part 32 is first inserted and firmly integrated into the holder 54 of the power tool 50, so that the insert part 32 is consequently connected to the power tool 50 in a force-fitting manner. In particular, means for mechanical locking, for example retaining, hook, latching, clamping and/or clip connections, are provided in order to fixedly insert the insert part 32 into the holder 54 of the power tool 50, so that a force-fitting and/or interlocking connection of the insert part 32 to the holder 54 of the power tool 50 results (not illustrated in any detail here).

The closure part 34, in particular the holder part 12, together with the batteries 16 which are to be inserted into the battery adapter 10, is then plugged onto or into the holder 54 and is connected either to the housing 52 of the power tool 50, in particular the holder 54, and/or to the insert part 32 using means 36 at least of one mechanical interface, and therefore is reversibly mechanically fasten ed. The means 36 comprise, in particular, a hook connection, and therefore a force-fitting and/or interlocking connection of the closure part 34 to the holder 54 and/or to the insert part 32 is ensured. The power tool 50 together with the inserted battery adapter 10 as shown in FIG. 2B is formed in the arranged state.

In an alternative embodiment, provision may also be made for the insert part 32 to be inserted into the holder 54 of the power tool 50 without fastening and then, together with the inserted batteries 16, to be reversibly mechanically fastened by means of the closure part 34.

Figure 4A:
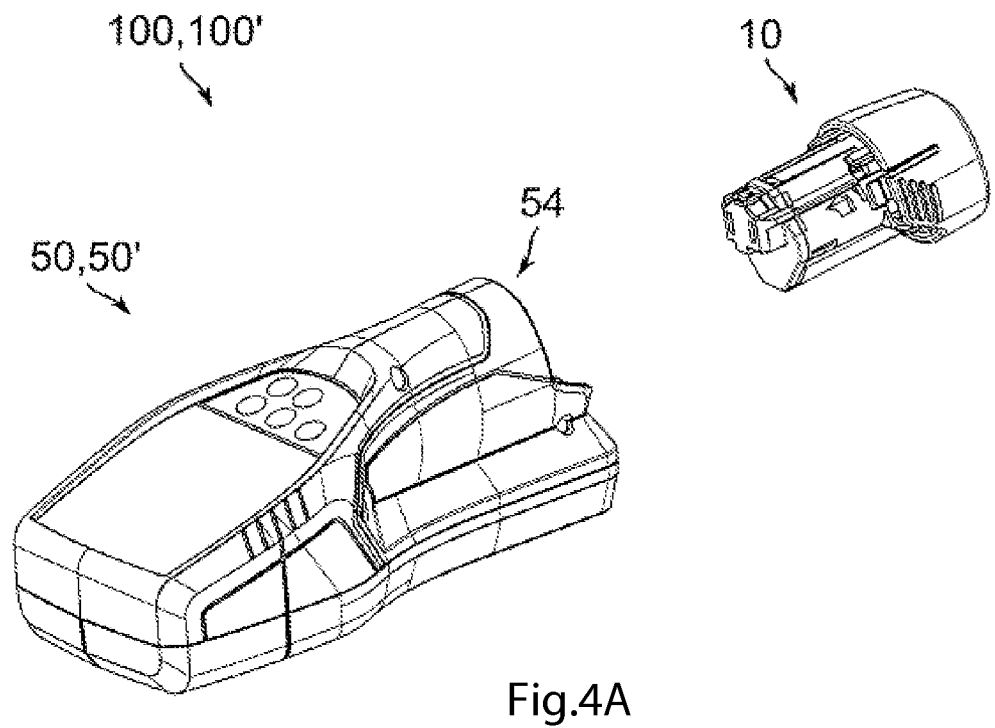
FIG. 4A shows a perspective view of a locating device of a power tool system in an open state.
Figure 4B:
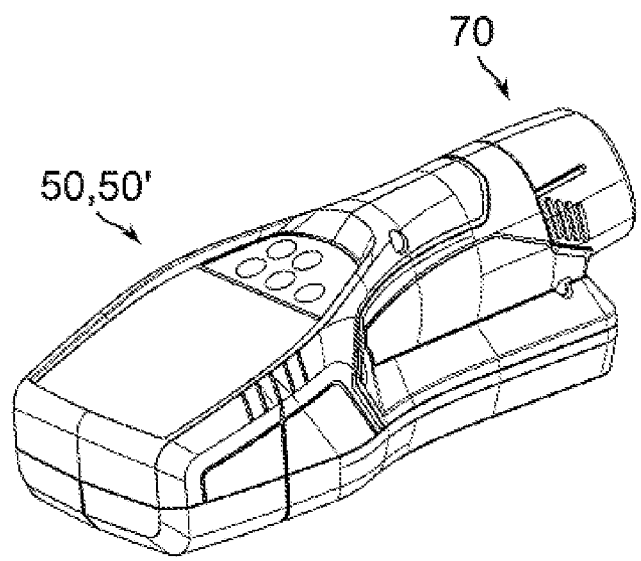
FIG. 4B shows a perspective view of the locating device in a closed state.
Figures 5A, 5B:
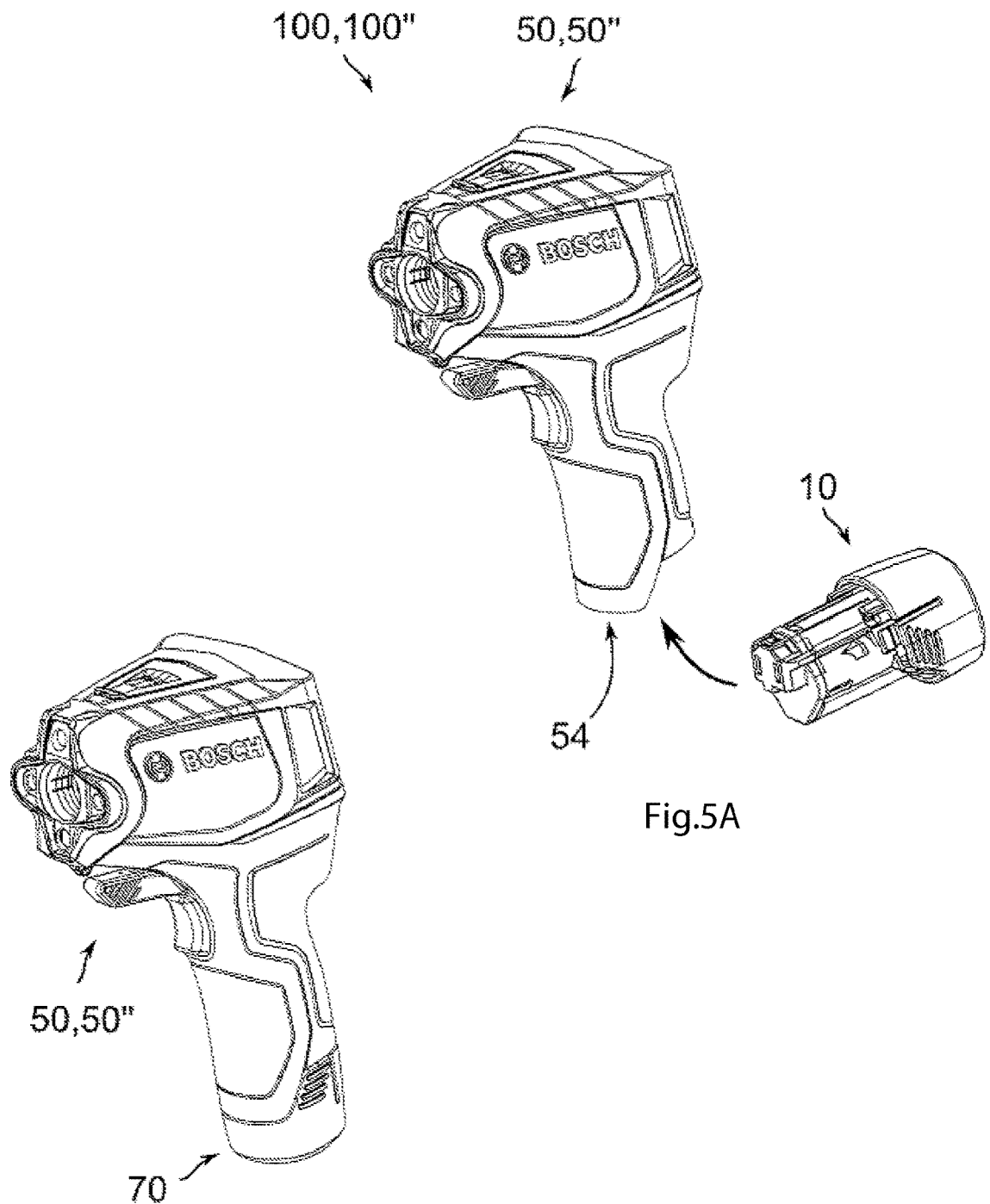
FIG. 5A shows a perspective view of a temperature measuring device of a power tool system in an open state.
FIG. 5B shows a perspective view of the temperature measuring device in a closed state.
Figure 6A:
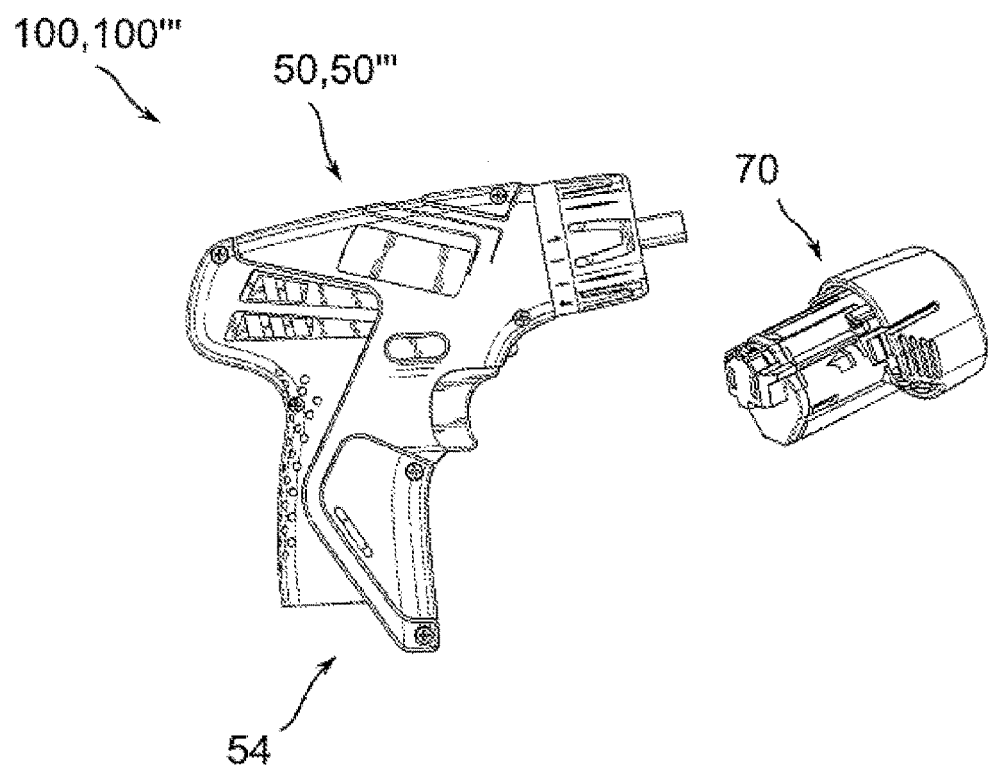
FIG. 6A shows a perspective view of a screwdriver/drill of the power tool system in an open state.
Figure 6B:
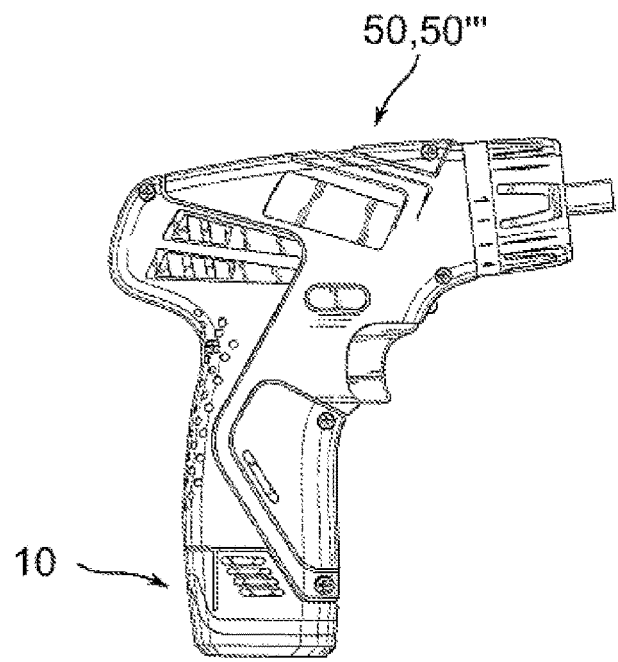
FIG. 6B shows a perspective view of the screwdriver/drill in a closed state.

FIGS. 4A, 4B, 5A, 5B, 6A, and 6B show different embodiments of a power tool system 100 according to the disclosure comprising various power tools 50, in particular including measuring tools, rechargeable battery packs 70 and also a battery adapter 10. In this case, a power tool system 100 comprises at least a power tool 50, a rechargeable battery pack 70 and also a battery adapter 10 which are provided in the combinations power tool 50 and rechargeable battery pack 70 or power tool 50 and battery adapter 10 to permit operation of the power tool 50. In FIGS. 4A and 4B, the power tool system 100' comprises, for example, two locating devices 50' in conjunction with a battery adapter 10 and a rechargeable battery pack 70. In FIGS. 5A and 5B, the at least one power tool 50 is realized by two thermal imaging cameras 50" in the same configuration. FIGS. 6A and 6B however shows two screwdrivers 50''' as examples of traditional power tools 50 in the same configuration of the power tool system 100'''. It should be noted that the power tool systems 100', 100", 100''' are not intended to be understood to be restricted by the exemplary embodiments, but rather that, in principle, any embodiment of a power tool 50 for use by a tradesperson or DIYer which appears to be expedient to a person skilled in the art can be supplied with energy using a battery adapter 10 and a rechargeable battery pack 70 in a power tool system 100 according to the disclosure. It should be noted in particular that any desired combination of power tools 50, for example the combination of the power tools 50', 50", 50''' shown in FIGS. 4A, 4B, 5A, 5B, 6A, and 6B likewise forms a power tool system 100 according to the disclosure too.

Any illustrated power tool 50 of a power tool system 100, in particular locating device 50', thermal imaging camera 50" and screwdrivers 50''', can be selectively operated, that is to say in particular can be supplied with electrical energy, using a rechargeable battery pack 70 or a battery adapter 10. The battery adapter 10 and the rechargeable battery pack 70 have an identical shape and are intended to be at least partially inserted into the same holder 54 of any power tool 50 of a power tool system 100. Therefore, the battery pack 70 and the battery adapter 10 in particular have the same, in particular mechanical and electrical, interfaces 22, 30, that is to say the rechargeable battery pack 70 and the battery adapter 10 both have in each case a shape of the mechanical and electrical interfaces 22, 30 which is compatible with, in particular complements, the holder 54 of the power tool 50.

In order to supply energy to a power tool 50, a rechargeable battery pack 70 or a battery adapter 10 is reversibly at least partially inserted, in particular plugged or pushed, into the holder 54 of the power tool 50. In order to mechanically lock and fasten the rechargeable battery pack 70 or the battery adapter 10 in the holder 54 of the power tool 50 and to electrically contact-connect the rechargeable battery pack 70 or the battery adapter 10 to the power tool 50, the holder 54 of the power tool 50 and also the rechargeable battery pack 70 and the battery adapter 10 have compatible mechanical and electrical interfaces 22, 30 for mechanically and/or electrically contact-connecting the power tool 50 and the rechargeable battery pack 70 or battery adapter 10. In this way, the mechanical interfaces serve to ensure the assignment of the appropriate battery adapter 10 or of the appropriate rechargeable battery pack 70 to the power tool 50 of a power tool system 100. The mechanical interfaces can be used, in particular, to permit insertion and electrical contact-connection of the battery pack 70 or of the battery adapter 10 only when the housing of the battery pack 70 or the housing of the battery adapter 10 has a shape which corresponds to the holder 54 of the power tool 50.

In one embodiment of the power tool system 100, the battery adapter 10 has an electrical identifier, not illustrated in any detail here, in the form of a coding resistor which can be read out from a power tool 50 of the power tool system 100 using an identification circuit or read-out circuit. It is therefore possible to determine whether a battery adapter 10 or a rechargeable battery pack 70 is used for supplying energy to the power tool 50 depending on the obtained value.

In an alternative exemplary embodiment, a mechanical identifier, for example in the form of an electrical switch, can also be provided instead of or in addition to the electrical identifier, the said mechanical identifier being operated when a battery adapter 10—but not a rechargeable battery pack 70—is inserted into the holder 54 of the power tool 50.

As a result of the identification of an inserted battery adapter 10 into the holder 54 of the power tool 50, the power tool 50, in particular the control apparatus of the said power tool or any other means 62 which is provided for this purpose (cf. FIGS. 2A and 2B), deactivates a deep-discharge protection apparatus 64 of the power tool 50 and activates a charging protection apparatus 66 (cf. FIGS. 2A and 2B). When rechargeable battery packs 70 are used, the deep-discharge protection apparatus 64 serves to prevent deep-discharging of the rechargeable battery pack 70 for safety reasons, while the charging protection apparatus 66 of the power tool 50 protects against charging of batteries 16 which cannot be recharged.

Furthermore, the power tools 50 of the power tool system 100 each have, in as much as is necessary or expedient from an electrical engineering point of view, a voltage converter apparatus 68 for adjusting an output voltage of the battery adapter 10, which output voltage serves to transform the output voltage or rated voltage of the battery adapter 10, in particular of the output voltage which is supplied by the four batteries 16, into an increased or reduced working voltage of the power tool 50 (cf. FIGS. 2A and 2B). This voltage converter apparatus 68 for adjusting the output voltage or the rated voltage of the battery adapter 10 is activated during operation of the power tool 50 as a result of it being identified that a battery adapter 10 is inserted into the holder 54 of the power tool 50. To this end, the power tool 50 has, in addition to the identification circuit or read-out circuit, further means 62' for activating or deactivating the voltage converter apparatus 68. These means 62' are realized as an electrical circuit, not illustrated in any detail here. The means 62, 62' can advantageously be integrated in a control apparatus of the power tool 50.

What is claimed is:

1. A power tool system, comprising:
   a rechargeable battery pack;
   a battery adapter configured to exchangeably hold at least one battery; and
   at least one power tool including a holder configured for at least partial insertion of the rechargeable battery pack in a first condition and the battery adapter in a second condition,
   wherein the rechargeable battery pack is configured for reversible insertion into the holder, the holder and the rechargeable battery pack having compatible mechanical and electrical interfaces configured for mechanical and electrical contact-connection of the at least one power tool and the rechargeable battery pack,
   wherein the battery adapter includes mechanical and electrical interfaces configured for (i) compatibility with the holder, (ii) reversible insertion into the holder, and (iii) mechanical and electrical contact-connection to the at least one power tool, the battery adapter being exclusively of a two-part configuration, and
   wherein the at least one power tool is configured to be selectively supplied with energy by the rechargeable battery pack in the first condition and by the battery adapter in the second condition.

2. The power tool system according to claim 1, wherein the battery adapter is configured to close the holder when the battery adapter is inserted into the holder.

3. The power tool system according to claim 1, the battery adapter comprising:
   at least one holder part configured to hold the at least one battery in the battery adapter; and
   a locking part configured to lock the holder part of the battery adapter.

4. The power tool system according to claim 3, wherein:
   the at least one locking part forms at least one insert part configured for at least partial insertion into the holder; and
   the at least one holder part forms a closure part.

5. The power tool system according to claim 4, wherein the at least one insert part is fixedly integrated with the holder.

6. The power tool system according to claim 4, wherein at least the closure part of the battery adapter is configured to lock the holder of the at least one power tool.

7. The power tool system according to claim 4, wherein the closure part of the battery adapter is configured to be mechanically fastened to the at least one insert part of the battery adapter and/or to a housing of the power tool.

8. The power tool system according to claim 4, wherein at least the at least one insert part of the battery adapter includes an electrical interface configured for electrical contact-connection to the at least one power tool.

9. The power tool system according to claim 4, wherein the battery adapter defines an axial length greater than a diameter of the at least one insert part.

10. The power tool system according to claim 1, wherein the battery adapter has one or more of a mechanical identifier and an electrical identifier configured to enable the at least one power tool to distinguish the battery adapter inserted into the holder in the second condition from the rechargeable battery pack inserted into the holder in the first condition.

11. The power tool system according to claim 10, wherein the at least one power tool comprises:
   an electrical circuit configured to, as a result of the at least one power tool identifying that the battery adapter is inserted into the holder, allow a deep-discharge protection apparatus of the at least one power tool to be deactivated and/or a charging protection apparatus of the at least one power tool to be activated.

12. The power tool system according to claim 1, wherein the battery adapter and/or the at least one power tool includes a voltage converter apparatus configured to adjust an output voltage of the at least one battery.

13. The power tool system according to claim 12, wherein the at least one power tool comprises:
   an electrical circuit configured to, at least during operation as a result of the at least one power tool identifying that the battery adapter is inserted into the holder, allow the voltage converter apparatus of the at least one power tool to be activated or to be deactivated.

14. The power tool system according to claim 1, wherein the battery adapter comprises:
   a temperature sensor configured to determine an ambient temperature of the at least one battery.

15. The power tool system according to claim 1, further comprising:

at least one mechanical interface of the battery adapter and/or of the at least one power tool, the at least one mechanical interface compatible with the holder for reversible insertion into the holder and/or for mechanical contact-connection to the at least one power tool, and the at least one mechanical interface including a retaining connection, a latching connection, and/or a hook connection.

16. The power tool system according to claim 1, wherein the at least one power tool is an electronic measuring tool.

17. A battery adapter for use in a power tool system including at least one power tool and a rechargeable battery pack, the at least one power tool having a holder for at least partial insertion of the rechargeable battery pack in a first condition and the battery adapter in a second condition, the rechargeable battery pack configured for reversible insertion into the holder, the holder and the rechargeable battery pack having compatible mechanical and electrical interfaces configured for mechanical and electrical contact-connection of the at least one power tool and the rechargeable battery pack, the battery adapter comprising:
- at least one holder part configured to hold at least one battery in the battery adapter;
- a locking part configured to lock the holder part;
- a mechanical interface configured for compatibility with the holder of the at least one power tool, for reversible insertion into the holder of the at least one power tool, and for mechanical connection to the at least one power tool; and
- an electrical interface configured for compatibility with the holder of the at least one power tool, for reversible insertion into the holder of the least one power tool, and for electrical contact-connection to the at least one power tool,
wherein the battery adapter is exclusively of a two-part configuration,
wherein the locking part forms at least one insert part configured for at least partial insertion into the holder, the insert part including portions of the mechanical interface and the electrical interface, and
wherein the at least one holder part forms a closure part configured to lock the holder of the at least one power tool.

\* \* \* \* \*